US008799905B2

(12) United States Patent
Koshiba

(10) Patent No.: US 8,799,905 B2
(45) Date of Patent: Aug. 5, 2014

(54) TASK ENVIRONMENT GENERATION SYSTEM, TASK ENVIRONMENT GENERATION METHOD, AND STORAGE MEDIUM

(75) Inventor: Kunihiro Koshiba, Tokyo (JP)

(73) Assignee: NEC Corporation, Tokyo (JP)

( * ) Notice: Subject to any disclaimer, the term of this patent is extended or adjusted under 35 U.S.C. 154(b) by 123 days.

(21) Appl. No.: 13/148,526

(22) PCT Filed: Feb. 23, 2010

(86) PCT No.: PCT/JP2010/052664
§ 371 (c)(1),
(2), (4) Date: Aug. 30, 2011

(87) PCT Pub. No.: WO2010/101042
PCT Pub. Date: Sep. 10, 2010

(65) Prior Publication Data
US 2012/0017215 A1 Jan. 19, 2012

(30) Foreign Application Priority Data
Mar. 4, 2009 (JP) ................................. 2009-050761

(51) Int. Cl.
*G06F 9/46* (2006.01)
(52) U.S. Cl.
USPC ........................................................ 718/100
(58) Field of Classification Search
CPC .................................................... G06F 9/4843
USPC ........................................................ 718/100
See application file for complete search history.

(56) References Cited

U.S. PATENT DOCUMENTS

| 7,254,624 B2 * | 8/2007 | Kinyon et al. ................. 709/220 |
| 7,647,589 B1 * | 1/2010 | Dobrovolskiy et al. .......... 718/1 |
| 7,779,091 B2 * | 8/2010 | Wilkinson et al. ............ 709/220 |
| 2002/0072929 A1 | 6/2002 | Azuma |
| 2002/0152254 A1 * | 10/2002 | Teng ............................ 709/100 |

(Continued)

FOREIGN PATENT DOCUMENTS

| CN | 1610890 A | 4/2005 |
| CN | 16108910 A | 4/2005 |

(Continued)

OTHER PUBLICATIONS

International Search Report for PCT/JP2010/052664 mailed Mar. 23, 2010.

(Continued)

*Primary Examiner* — Emerson Puente
*Assistant Examiner* — Charlie Sun
(74) *Attorney, Agent, or Firm* — Sughrue Mion, PLLC

(57) ABSTRACT

In generating a task environment by a thin client system, it is desired to reduce the man-hour of the operation of the system construction and setting. Specifically, a task environment setting table stores task environment conditions for every projects or task forces. A task environment setting section automatically performs the settings required for task at the timing when the desktop environment generation section generates the desktop environment in accordance with the setting in the task environment setting table. Before a user makes a connection with a desktop environment via a session management section to start a task, the session management section performs setting to a task environment generation agent for each user. As a result, not only a simple desktop environment, but also the environment for the task is automatically set.

9 Claims, 12 Drawing Sheets

(56) References Cited

U.S. PATENT DOCUMENTS

| | | | |
|---|---|---|---|
| 2009/0043903 A1* | 2/2009 | Malik et al. | 709/229 |
| 2009/0254620 A1* | 10/2009 | Best et al. | 709/206 |
| 2010/0186063 A1* | 7/2010 | Oba et al. | 726/1 |
| 2010/0246443 A1* | 9/2010 | Cohn et al. | 370/255 |
| 2010/0332489 A1* | 12/2010 | Benari et al. | 707/759 |
| 2011/0004676 A1* | 1/2011 | Kawato | 709/221 |
| 2011/0179412 A1* | 7/2011 | Nakae et al. | 718/1 |

FOREIGN PATENT DOCUMENTS

| | | |
|---|---|---|
| EP | 0 747 840 A1 | 12/1996 |
| JP | 6-337828 A | 12/1994 |
| JP | 8-161393 A | 6/1996 |
| JP | 2002183421 A | 6/2002 |
| JP | 2004264905 A | 9/2004 |
| JP | 2004535630 A | 11/2004 |

OTHER PUBLICATIONS

D. Kumano, "Kensho Labo XenDesktop ni yoru Desktop kaso-ka Kankyo Kochiku to Kaso Disk Sakusei ni Tema Nichijo no Un'yo Fuka wa Keigen Sareru", Nikkei Systems, Dec. 26, 2008, No. 189, pp. 72-75.

Japanese Office Action for JP2009-050761 issued Dec. 1, 2010.

"The Final Beta Version Appears at Last, verify Windows2000 beta 3", Nikkei Windows NT, Japan, Nikkei Business Publications, Inc., No. 28, Jul. 1, 1999, pp. 11-24.

Chinese Office Action for CN Application No. 201080007363.8 issued on Jun. 5, 2013 with English Translation.

* cited by examiner

Fig. 3

DESKTOP ENVIRONMENT SETTING TABLE 21

| TEMPLATE | DIVISION | ASSIGNMENT | POST |
|---|---|---|---|
| TEMPLATE A | PERSONNEL DIVISION | Null | Null |
| TEMPLATE B | PLANNING DIVISION | TRAINING | PERSON IN CHARGE |
| TEMPLATE C | PLANNING DIVISION | PLANNING | DIVISION MANAGER |

Fig. 4

TASK ENVIRONMENT SETTING TABLE
23

| PROJECT NAME | USING AP | FILE SERVER | TASK SERVER | PROJECT PERIOD |
|---|---|---|---|---|
| PROJECT A | AP1 | SERVER 1 ¥ FOLDER X | AP3 OF SERVER 3 | 2008.1.1~2008.9.31 |
| PROJECT B | AP1, AP2 | NULL | AP4 OF SERVER 4 | 2008.2.1~2008.4.31 |
| TASK FORCE C | NULL | SERVER 2 ¥ FOLDER Y | NULL | INDEFINITE |

Fig. 5

25 PROCESSING RESULT TABLE

| ACCOUNT | DESKTOP ENVIRONMENT | BELONGING PROJECT | PROPER CONDITION |
|---|---|---|---|
| USER A | DESKTOP ENVIRONMENT (10-X) | PROJECT A, B | AP3 |
| USER B | DESKTOP ENVIRONMENT (10-Y) | PROJECT A | USB UNAVAILABLE |
| USER C | DESKTOP ENVIRONMENT (10-Z) | PROJECT A | PRINTER UNAVAILABLE |

Fig. 7

USER ORGANIZATION TABLE 31

| ACCOUNT | DIVISION | ASSIGNMENT | POST |
|---------|----------|------------|------|
| USER A | PERSONNEL DIVISION | RECRUITMENT | DIVISION MANAGER |
| USER B | PLANNING DIVISION | TRAINING | PERSON IN CHARGE |
| USER C | PLANNING DIVISION | TRAINING | PERSON IN CHARGE |

Fig. 8

PROJECT TABLE 32

| PROJECT NAME | BELONGING MEMBER | MEMBER PROPER SETTING |
|---|---|---|
| PROJECT A | USER A | AP3 |
| | USER B | USB UNAVAILABLE |
| | USER C | PRINTER UNAVAILABLE |
| PROJECT B | USER A | NOT EXIST |
| | USER D | NOT EXIST |
| TASK FORCE C | USER E | · · · · |
| | USER F | · · · · |
| | USER G | |

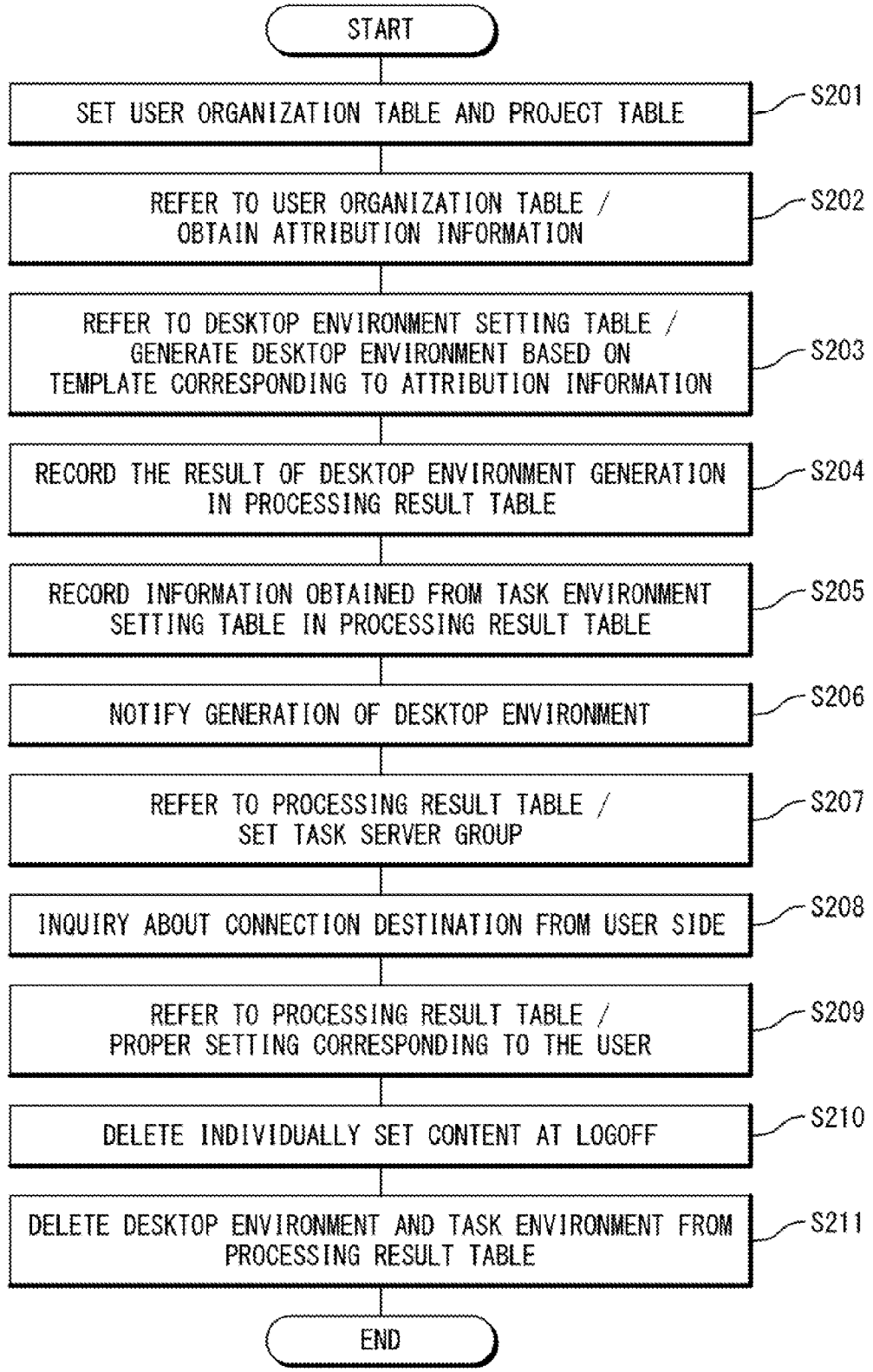

ures are shown as only one example.
TASK ENVIRONMENT GENERATION SYSTEM, TASK ENVIRONMENT GENERATION METHOD, AND STORAGE MEDIUM

TECHNICAL FIELD

The present invention relates to a task environment generation system, and especially relates to a task environment generation system in a thin client system.

BACKGROUND ART

In these years, from the viewpoints of security and an internal control, a thin client system where client environments are aggregated on a server has attracted attentions.

FIG. 1 shows an example of a conventional thin client system.

The conventional thin client system includes a desktop environment 10 (10-$i$, $i=1$ to n: n is an arbitrary number), a network infrastructure apparatus group 4, and a task server group 5.

The desktop environment 10 (10-$i$, $i=1$ to n) is the client environment including resources such as application software and a file that are managed on the server side and used by a thin client terminal. There is at least one desktop environment 10 (10-$i$, $i=1$ to n).

The network infrastructure apparatus group 4 is a relay apparatus group for relaying a communication between the desktop environment 10 (10-$i$, $i=1$ to n) and the task server group 5 via a network. Here, the network infrastructure apparatus group 4 includes a firewall 41 and a network apparatus 42. These are shown as only one example.

The task server group 5 is a serve group on the network for providing Web services to the desktop environment 10 (10-$i$, $i=1$ to n). Here, the task server group 5 includes a Web server 51, an FTP (File Transfer Protocol) server 52, and a file server 53. These are shown as only one example.

As described above, in the conventional thin client system, a client environment (the desktop environment) is created, and then a user allowed to connect to the client environment is set.

In this method, it is required to separately manage: a user and attribution associated with the user (a personnel information such as a division and a post); and a setting of the thin client system; and the number how many desktop environments are prepared, and accordingly management man-hour is required.

Additionally, in the above-mentioned separate management, not only forgetting of construction of the desktop environment but also a security risk due to a setting mistake and due to forgetting of deletion could be caused.

Regarding this, a solution that automatically generates the desktop environment on the basis of the attribution belonging to a user (the division, the post, and the like) can be considered.

However, according to such a solution, in the conduction of task, the task cannot be smoothly started by only generating the desktop environment based on the personnel attribution, because there is a case that the task is actually conducted in units of projects executed for a certain period even the personnel attribution is not changed, or a task organization (a task force) intersecting divisions is formed.

For example, as shown in FIG. 1, in the conventional thin client system, the desktop environment 10 usually does not exist independently, and accordingly it is required to set the servers and apparatuses such as the task server group 5 and the network apparatus group 4 for task. In addition, there is a problem that the task cannot be smoothly started before the setting is completed.

Further, in the case of a conventional rich client, applications required by a user and available devices are usually set to the rich client dedicated to the user. That is, there is sometimes the case where the customization for each user is practically realized by the individual setting of the rich client.

Regarding this, in the thin client system, the desktop environment is virtualized, and accordingly there is a case where an individual user does not use a specific desktop environment, but an unspecified user uses an unspecified desktop environment. That is, there is a problem that the unique setting of the hardware of a conventional rich client cannot be transferred to the desktop environment shared in the thin client system, thereby interfering with the task.

As a related technique, JP-A-Heisei 6-337828 (Patent literature 1) discloses an information processing environment movement method. In the related technique, a device icon can be separated into an apparatus icon and an environment icon, and further processing programs, data, and setting that specify a usage environment of each information processing device can be simply transferred to another information processing device only by an operation of the environment icon, thereby intending that only the usage environment of each information processing device is moved in a simple operation without moving the hardware of each information processing device.

JP-A-Heisei 8-161393 (Patent literature 2) discloses a task system. In this related technique, a task management calculator mounts: means for defining operation environment information that registers contents of a plurality of operations; means for registering the relationship between structure units of an organization and users; means for registering a partial responsibility of an operation of the structure unit; and means for distributing the operation environment information to each user on the basis of the partial responsibility. In this manner, the task management calculator defines the structure of the organization and task to distribute the definition to a user.

Japanese patent application Publication JP-P2004-535630A (Patent literature 3) discloses a system, a method, and a computer program product for setting an environment of a calculator system. In the related technique, the environment of the calculator system is set on the basis of an aspect of the specific calculator system existing for a specific operation session. In addition, by updating environment setting attribution of a basic environment setting file on the basis of environment setting attribution included in an aspect environment setting file, a session environment setting file is generated.

CITATION LIST

Patent Literature

[PTL1] Patent literature 1: Japanese patent application Publication JP-A-Heisei 6-337828
[PTL2] Patent literature 2: Japanese patent application Publication JP-A-Heisei 8-161393
[PTL3] Patent literature 3: Japanese patent application Publication JP-P2004-535630A

SUMMARY OF INVENTION

In these years, the thin client system has attracted attentions and has been increasingly introduced. The thin client system has various merits in points of: ensuring of the security; the reinforcement of the internal control; and reduction of maintenance operations for the client by an end-user, and the like.

However, in the thin client system, the processing is concentrated on a center, and accordingly a load of the system management division is increased.

Specifically, in conduction of the actual task, it is also required to set various servers and apparatuses, and thus there has been a problem that takes much management man-hour in the setting operations.

Accordingly, in the thin client system, it is one of the important points to reduce operation costs in the system division.

According to the present invention, a task environment generation system includes: a user organization table; a desktop environment setting table; a desktop environment generation means; a project table; a task environment setting table; and a task environment setting means.

The user organization table stores a correspondence between a user and attribution information relevant to the user. The desktop environment setting table stores a correspondence between the attribution information relevant to the user and a template of a desktop environment. The desktop environment generation means obtains the attribution information relevant to the user whose information is changed by referring to the user organization table when the information of the user stored in the user organization table is changed, and obtains the template of the desktop environment corresponding to the obtained attribution information by referring to the desktop environment setting table, and generates the desktop environment based on the obtained template. The project table stores a correspondence between the user and a project to which the user belongs. The task environment setting table stores the project and a definition of a task environment used to perform the project. The task environment setting means obtains information of the project to which the user belongs by referring to the project table when the desktop environment generation means generates the desktop environment, and performs setting of the task environment to: the desktop environment; and an apparatus included in any of a network infrastructure apparatus group and a task server group which are provided for performing a task by the desktop environment based on the definition of the task environment corresponding to the project to which the user belongs.

According to the present invention, in a task environment generation method, a correspondence between a user and attribution information relevant to the user is stored in a user organization table. A correspondence between the attribution information relevant to the user and a template of a desktop environment is stored in a desktop environment setting table. The attribution information relevant to the user whose information is changed is obtained by referring to the user organization table when the information of the user stored in the user organization table is changed. The template of the desktop environment corresponding to the obtained attribution information is obtained by referring to the desktop environment setting table. The desktop environment is generated based on the obtained template. A correspondence between the user and a project to which the user belongs is stored in a project table. The project and a definition of a task environment used to perform the project are stored in a task environment setting table. Information of the project to which the user belongs is obtained by referring to the project table when the desktop environment generation means generates the desktop environment. Setting of the task environment is performed to: the desktop environment; and an apparatus included in any of a network infrastructure apparatus group and a task server group which are provided for performing a task by the desktop environment based on the definition of the task environment corresponding to the project to which the user belongs.

According to the present invention, a task environment generation program is provided for making a computer execute: a step of storing a correspondence between a user and attribution information relevant to the user in a user organization table; a step of storing a correspondence between the attribution information relevant to the user and a template of a desktop environment in a desktop environment setting table; a step of obtaining the attribution information relevant to the user whose information is changed by referring to the user organization table when the information of the user stored in the user organization table is changed, and obtaining the template of the desktop environment corresponding to the obtained attribution information by referring to the desktop environment setting table, and generating the desktop environment based on the obtained template; a step of storing a correspondence between the user and a project to which the user belongs in a project table; a step of storing the project and a definition of a task environment used to perform the project in a task environment setting table; and a step of obtaining information of the project to which the user belongs by referring to the project table when the desktop environment generation means generates the desktop environment, and performing setting of the task environment to: the desktop environment; and an apparatus included in any of a network infrastructure apparatus group and a task server group which are provided for performing a task by the desktop environment based on the definition of the task environment corresponding to the project to which the user belongs. The task environment generation program according to the present invention can be stored in a recording device or a recording medium.

Accordingly, the operation man-hour for the system construction and setting can be reduced.

BRIEF DESCRIPTION OF DRAWINGS

FIG. 3 is a diagram showing an example of a desktop environment setting table;

FIG. 4 is a diagram showing an example of a task environment setting table;

FIG. 5 is a diagram showing an example of a processing result table;

FIG. 7 is a diagram showing an example of a user organization table;

FIG. 8 is a diagram showing an example of a project table;

FIG. 11 is a flowchart showing an operation according to a second exemplary embodiment of the present invention.

DESCRIPTION OF EMBODIMENTS

Referring to the accompanying drawings, a first exemplary embodiment of the present invention will be explained below.

Figure 2:
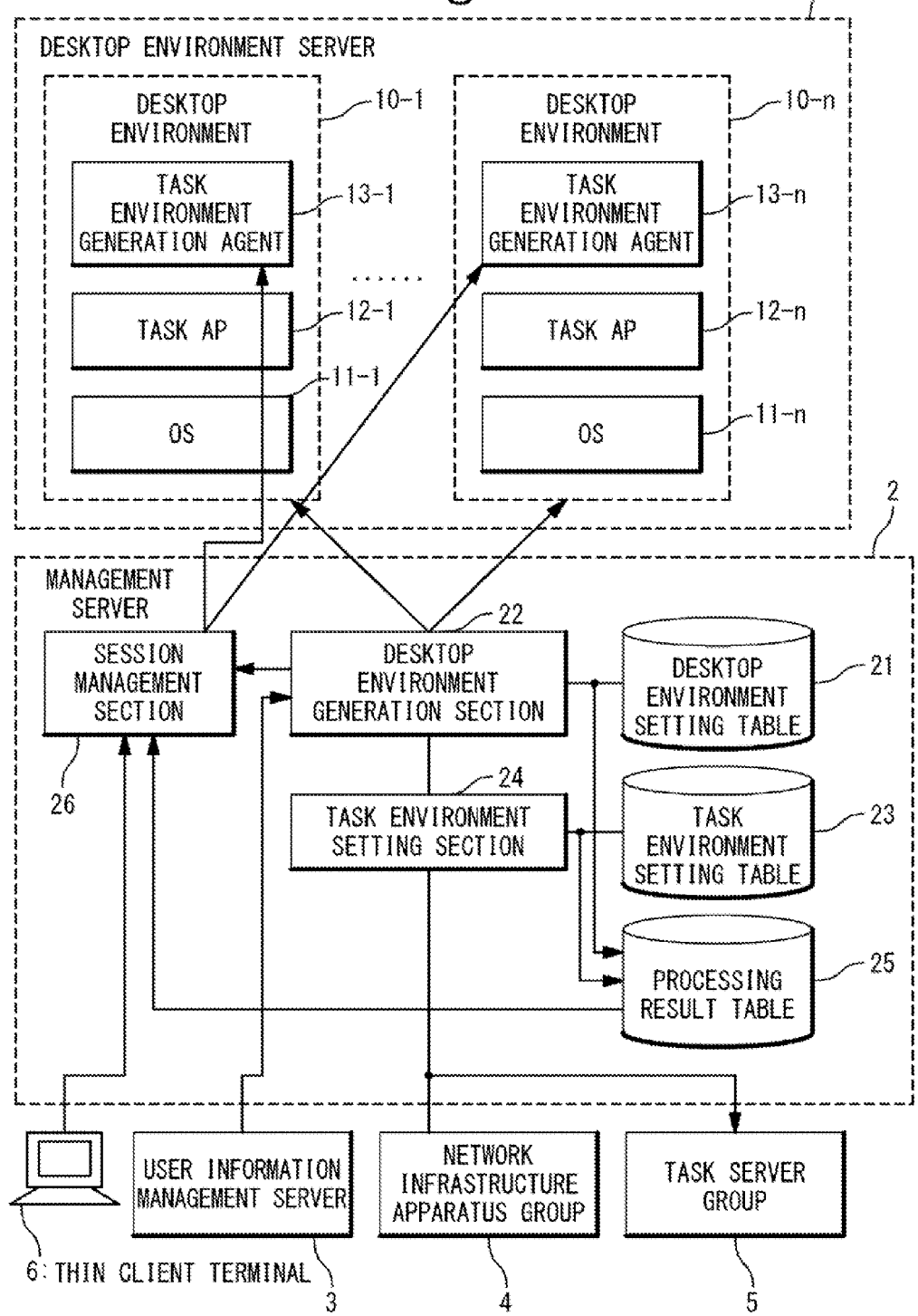
FIG. 2 is a schematic view showing a configuration example of a task environment generation system of the present invention.

As shown in FIG. 2, a task environment generation system of the present invention includes a desktop environment server 1, a management server 2, a user information management server 3, a network infrastructure apparatus group 4, a task server group 5, and a thin client terminal 6.

On the desktop environment server 1, a desktop environment including: an OS (Operating System) to which a user connects with use of a remote desktop protocol and the like; a commonly-used AP (Application Software) such as virus check software; and a task environment generation agent that executes a unique setting of the desktop environment in accordance with an instruction of the management server 2 operates.

Here, the desktop environment server 1 includes a desktop environment 10 (10-$i$, $i$=1 to n: n is arbitrary number).

The desktop environment 10 is a virtual machine (VM) environment that operates on the desktop environment server 1.

As shown in FIG. 2, each desktop environment 10 (10-$i$, $i$=1 to n) includes the OS 11 (11-$i$, $i$=1 to n), the task AP 12 (12-$i$, $i$=1 to n), and the task environment generation agent 13 (13-$i$, $i$=1 to n).

The OS 11 (11-$i$, $i$=1 to n) is software used by a user to connect to the desktop environment 10 with use of a remote desktop protocol and the like.

The task AP 12 (12-$i$, $i$=1 to n) is software commonly used by a user with use of the remote desktop protocol and the like.

The task environment generation agent 13 (13-$i$, $i$=1 to n) executes a unique setting to the desktop environment 10 in accordance with an instruction from the management server 2.

The management server 2 is a server that: manages sessions of the desktop environment server 1 and the thin client terminal 6; connects to the network infrastructure apparatus group 4 and the task server group 5; and connects to servers and apparatuses related in the task.

As shown in FIG. 2, the management server 2 includes a desktop environment setting table 21, a desktop environment generation section 22, a task environment setting table 23, a task environment setting section 24, a processing result table 25, and a session management section 26.

The desktop environment setting table 21 stores a correspondence relationship between attributions associated with a user (a division and a post) and a form (template) of the desktop environment. Here, the desktop environment setting table 21 stores a correspondence between a template of the desktop and the division, the task, and the post which are allowed to use the template. For example, as shown in FIG. 3, the desktop environment setting table 21 stores information showing a relationship, for example, in the case where the division of the user is a personnel division, the desktop environment is generated with use of a template A. Here, the form (template) of the desktop environment is a virtualized OS image. To the form (template) of the desktop environment, a basic setting of the OS 11 (11-$i$, $i$=1 to n) and the task AP 12 (12-$i$, $i$=1 to n) are installed (introduced).

The desktop environment generation section 22 executes desktop environment generation processing from the form (template) of the desktop environment by referring to each table of the user information management server (a user organization table 31 and a project table 32) described below and the desktop environment setting table 21. The desktop environment generation section 22 generates the desktop environment 10 (10-$i$, $i$=1 to n) by the copying from the form (template) of the desktop environment and the internal execution of the "sysprep" and the like.

The task environment setting table 23 stores a correspondence relationship between projects and the definition of the task environment required in conduction of the projects. Here, the task environment setting table 23 stores the correspondence between the project name being an identification information of the project and an available AP, a file server, a task server which are used in the project, and a project period. For example, as shown in FIG. 4, the task environment setting table 23 stores information showing a relationship, in which; in the "project A", the AP to be used is an "AP1", a "folder X on the server1" is used as the file server, and a "AP3 of the server3" is used as the task server.

The task environment setting section 24 performs setting to the network infrastructure apparatus group 4 and the task server group 5 by referring to the task environment setting table 23 in parallel with the generation of the desktop environment 10 (10-$i$, $i$=1 to n) by the desktop environment generation section 22.

In the processing result table 25, the processing results of the desktop environment generation section 22 and the task environment setting section 24 are recorded. Here, the processing result table 25 stores the correspondence between the account which is a user identification information and the desktop environment generated to the user, a project to which the user belongs, and a unique condition of each user. For example, as shown in FIG. 5, the processing result table 25 shows that a "desktop environment 10-X" that is the desktop environment generated to a "user A" is used by "projects A and B" that are projects to which the user belongs, and the "AP3" is used as the unique condition showing the individually-required setting when the "user A" conducts the project.

The session management section 26 establishes a session to the thin client terminal 6 used by a user, and monitors the communication between the desktop environment server 1 and the thin client terminal 6. Here, the desktop environment generation section 22 generates the desktop environment 10 (10-$i$, $i$=1 to n) via the session management section 26.

The user information management server 3 is a server for storing information that defines the personnel information and members belonging to the project.

Figure 1:
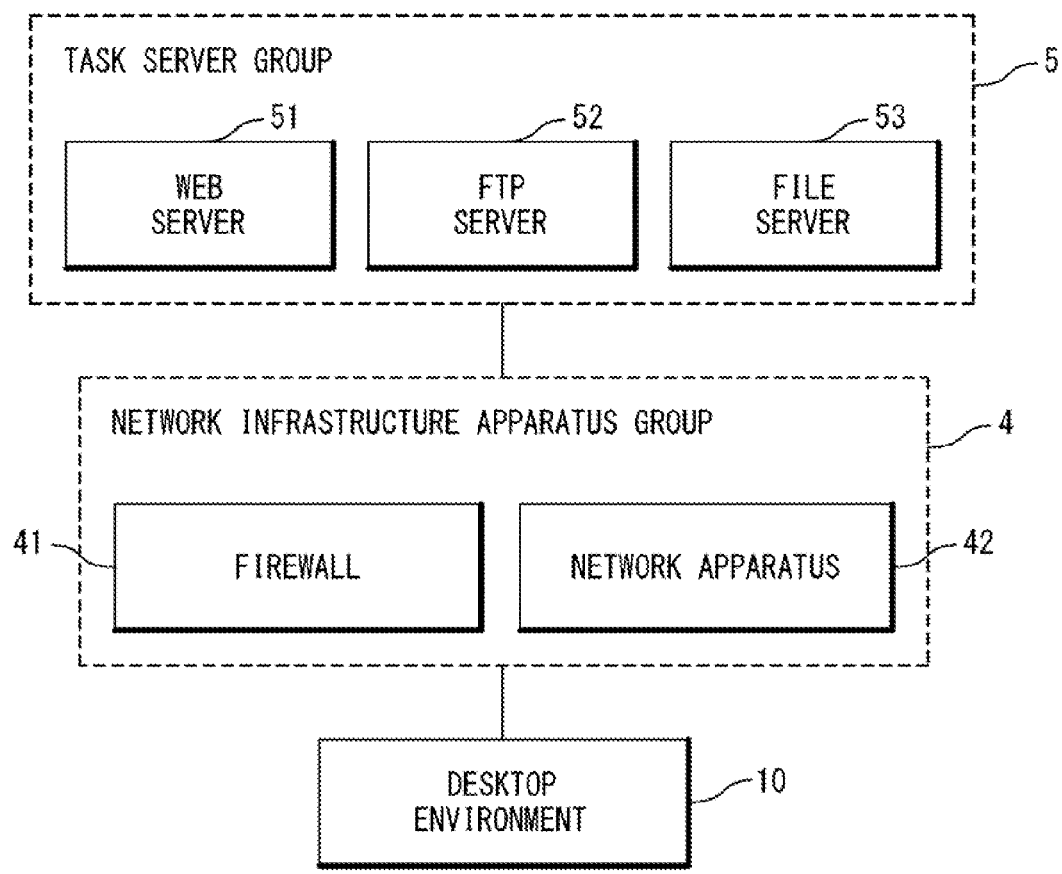
FIG. 1 is a schematic view showing a configuration example of a conventional thin client system.

The network infrastructure apparatus group 4 and the task server group 5 are the same as those shown in FIG. 1.

The thin client terminal 6 communicates with the desktop environment server 1, and uses the desktop environment 10 (10-$i$, $i$=1 to n).

Figure 6:
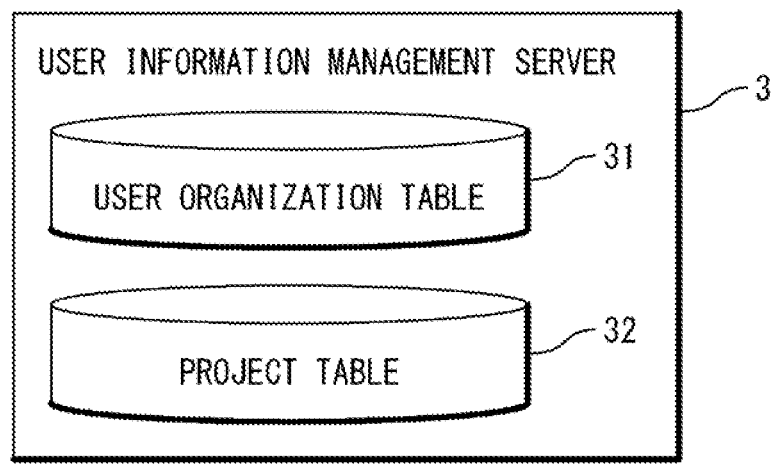
FIG. 6 is a schematic view showing a configuration example of a user information management server.

As shown in FIG. 6, the user information management server 3 includes the user organization table 31 and the project table 32.

The user organization table 31 stores the information showing the relationship between a user and attribution associated with the user (a division and a post). Here, the user organization table 31 stores the correspondence between the account which is identification information of a user and the division, task, and the post to which the user belongs. For example, as shown in FIG. 7, the user organization table 31 shows that the "user A" belongs to the "personnel division" and is a "manager" of "recruitment" task.

The project table 32 stores the information showing relationships between a project and members (users) belonging to the project and the unique settings of the respective users in the project. Here, the project table 32 stores the correspondence between the project name which is identification information of the project and users belonging to the project and the unique setting of the user. For example, as shown in FIG. 8, the project table 32 stores a statistically-determined condition in each organization such as the user organization table 31 shown in FIG. 7, for example, even in the "project A", only the "user A" uses the "AP3", and in order to improve the security, the "user B" is prohibited to use devices of USB (Universal Serial Bus)-connection (USB is not available), and a condition other than a statistically-determined condition in each project.

Figure 9:
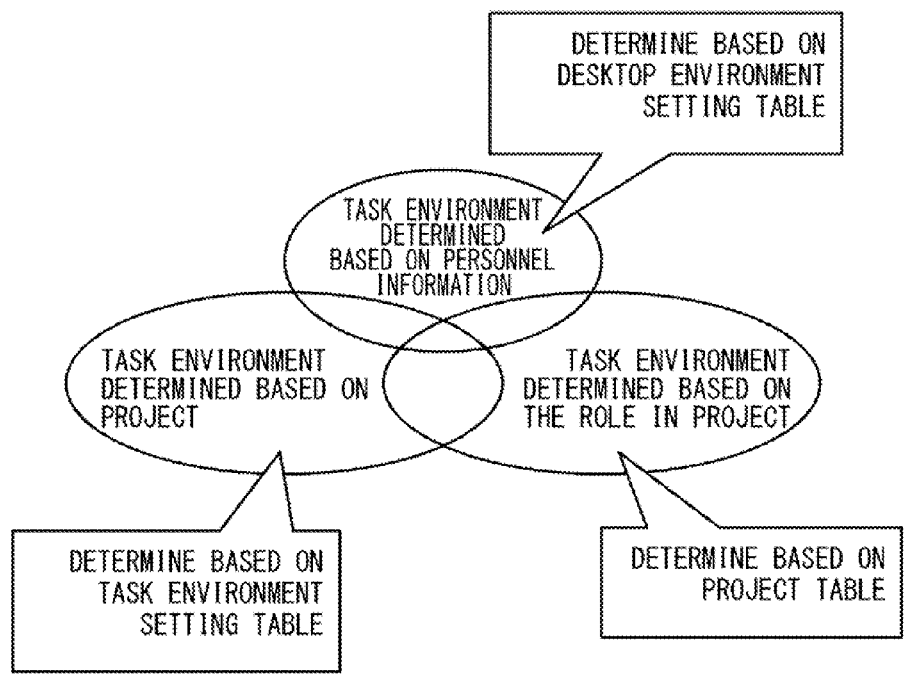
FIG. 9 is a diagram for explaining a role of each table.

As a reference, FIG. 9 shows a relationship between "conditions" required in the preparation of task environment and the "tables" of the present invention. For example, the "task environment determined on the basis of the personnel information" is determined by the desktop environment setting table 21 shown in FIG. 3. The "task environment determined on the basis of the project" is determined by the task environment setting table 23 shown in FIG. 4. The "the task environment determined on the basis of the role in the project" is determined by the project table 32 shown in FIG. 8.

The user organization table 31 and the project table 32 may be collected in one table. In addition, it can be considered that the user and the organization information are constructed by a directory server such as the "ActiveDirectory (a registered trademark)" of Microsoft Co., Ltd (a registered trademark).

Figure 10A:
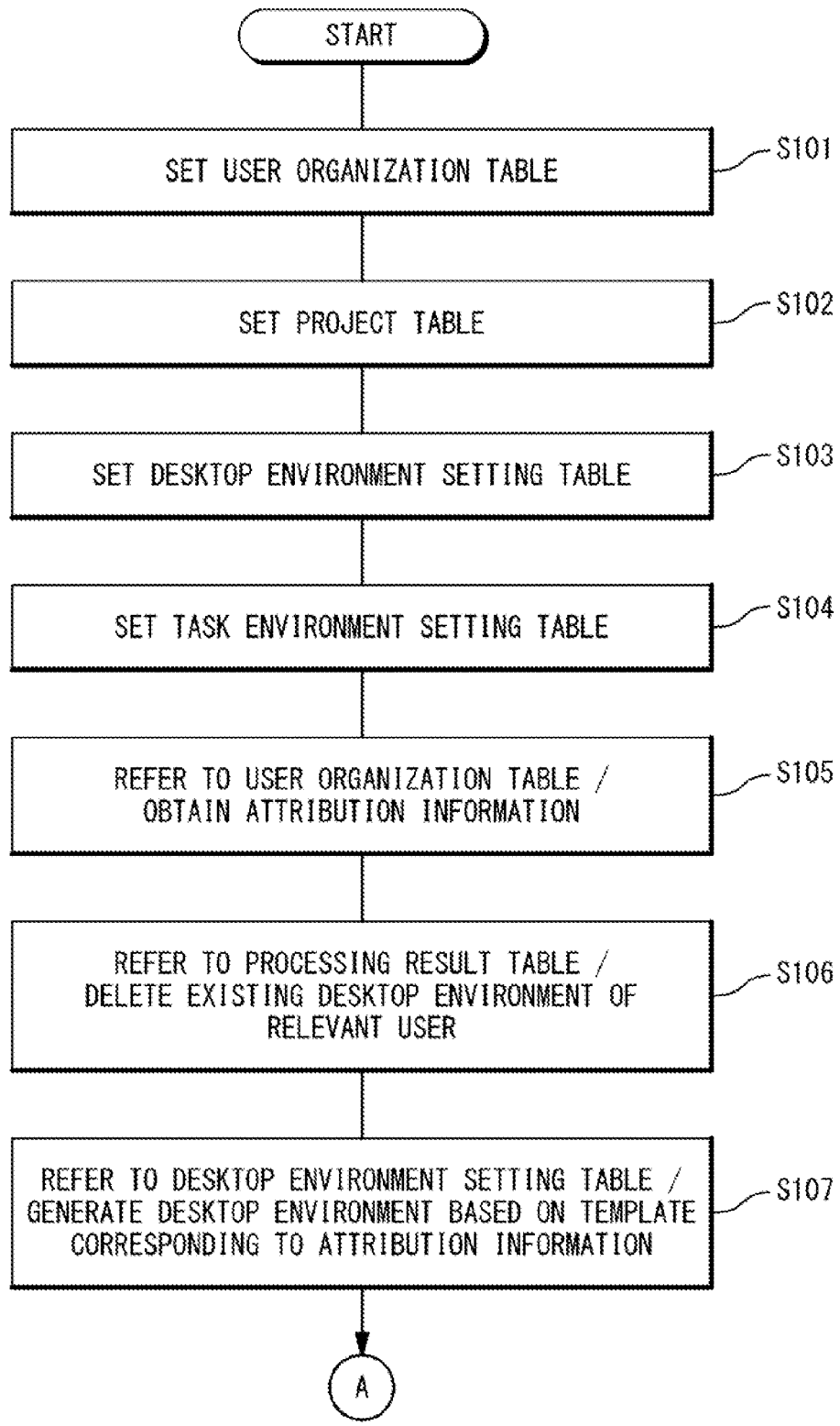
FIG. 10A is a flowchart showing an operation according to a first exemplary embodiment of the present invention.
Figure 10B:
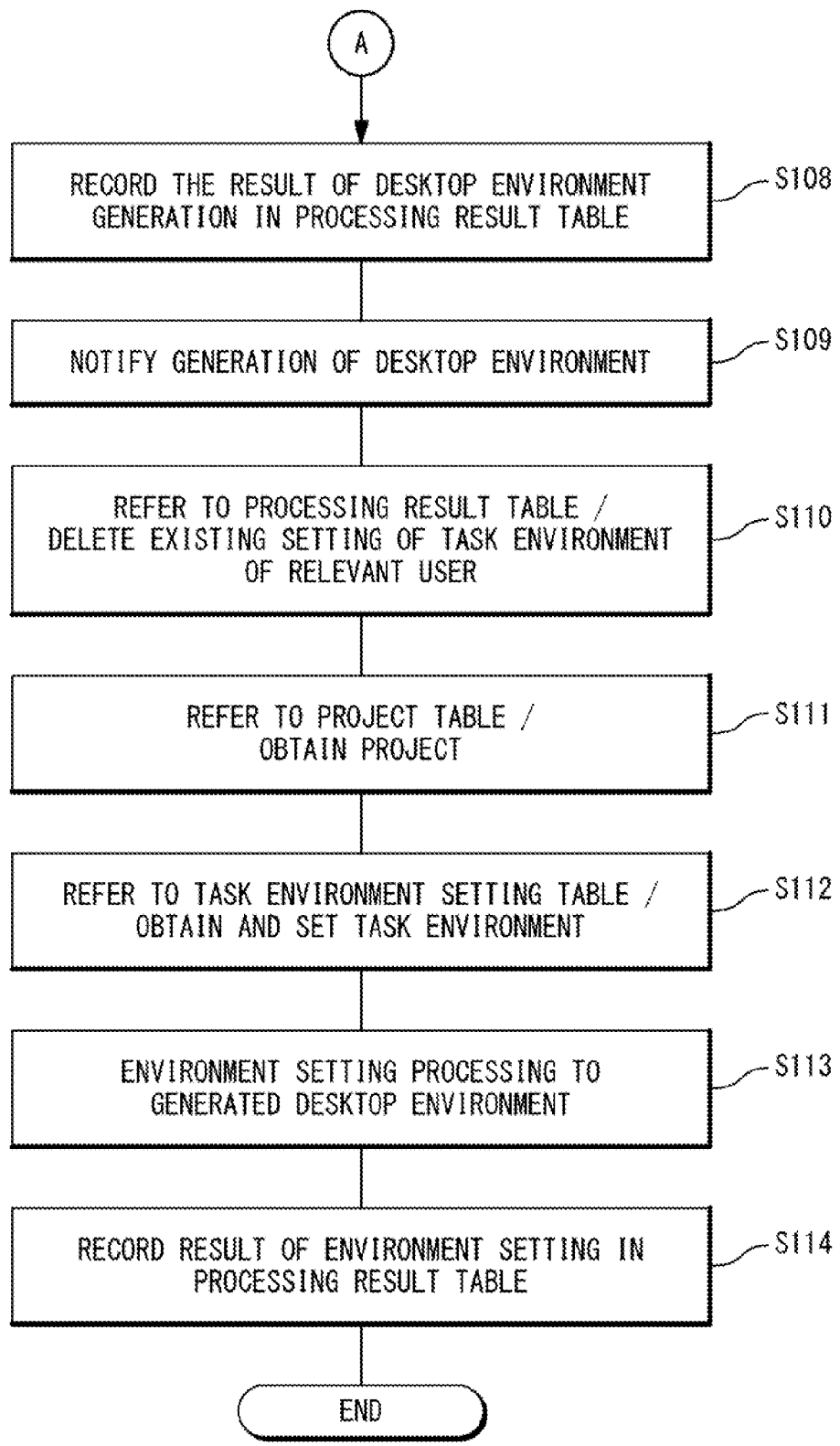
FIG. 10B is a flowchart showing an operation according to the first exemplary embodiment of the present invention.

Referring to FIGS. 10A and 10B, an operation of the task environment generation system according to the first exemplary embodiment of the present invention will be explained.

(1) Step S101

At first, the user information management server 3 sets the user organization table 31. Here, as shown in FIG. 7, the user information management server 3 stores the information showing the relationship between a user and the attribution (the division and the post) of the user in the user organization table 31. For example, in the case of generating the desktop environment and task environment of the user A, the user information management server 3 firstly adds the user A to the user organization table 31 as the personnel information, and relates the attribution of the user A to the user to store them.

(2) Step S102

The user information management server 3 sets the project table 32. Here, as shown in FIG. 8, the user information management server 3 stores the information showing the relationships between the projects, the members belonging to the projects, and the unique settings of the respective members. For example, the user information management server 3 records the project of which the user A becomes in charge, and the condition required only for the user A in the project in the project table 32. In the case where the user A is constantly engaged in a routine work and has no relationship with projects and tasks which intersects divisions, the registration to the project table 32 is not required.

(3) Step S103

The management server 2 sets the desktop environment setting table 21. As shown in FIG. 3, the management server 2 stores information showing a relationship between a template of the desktop environment and a division and a post using the template in the desktop environment setting table 21.

(4) Step S104

The management server 2 sets the task environment setting table 23. As shown in FIG. 4, the management server 2 stores the projects and the definitions of the task environments required for the projects in the task environment setting table 23.

(5) Step S105

Next, the desktop environment generation section 22 obtains the added or updated attribution information (personnel division and the like in FIG. 7) related to the user A at periodical timing or at any timing corresponding to a human operation by referring to the user organization table 31.

(6) Step S106

Then, referring to the processing result table 25, in the case where the desktop environment was generated to the user A in past times, the desktop environment generation section 22 deletes the desktop environment. That is, the desktop environment generation section 22 deletes the already-existing desktop environment of the user.

(7) Step S107

Moreover, referring to the template related to the personnel division (the template A in FIG. 3) in the desktop environment setting table 21, the desktop environment generation section 22 generates the desktop environment 10-X in the desktop environment server 1. That is, referring to the desktop environment setting table 21, the desktop environment generation section 22 generates the new desktop environment on the basis of the template based on the attribution information.

(8) Step S108

The desktop environment generation section 22 records the result of generation of the desktop environment 10-X to the processing result table 25. For example, as shown in FIG. 5, the desktop environment generation section 22 records to the processing result table 25 that the desktop environment 10-X has been generated for the user A.

(9) Step S109

At the same time, the desktop environment generation section 22 notifies the generation of the desktop environment 10-X for the user A to the task environment setting section 24.

(10) Step S110

Referring to the processing result table 25, in the case where the task environment was set to the user A in past times, the task environment setting section 24 deletes the set contents. For example, when deletion of the setting is performed, the task environment setting section 24 obtains the set contents in the same order as the gene rat ion method explained below to delete the setting. That is, the task environment setting section 24 deletes the already-set task environment of the user.

(11) Step S111

Next, referring to the project table 32, the task environment setting section 24 obtains the project to which the user A belongs (the project A and the project B in FIG. 8).

(12) Step S112

Then, referring to the task environment setting table 23, the task environment setting section 24 obtains the task environment required for the project to which the user A belongs, and sets the related servers or apparatuses on the basis of the obtained information. In FIG. 4, in the task environment required for the project to which the user A belongs, in the example of the project A, the available AP is the "AP1", the file server is the "folder X on the server 1", and the task server is the "AP3 of the server 3". For example, in the case of the project A, in order to access the file server (the server 1 in FIG. 4) of the network infrastructure apparatus group 4, the task environment setting section 24 changes the setting of firewall and gives an access authority to the file server and the folder X so as to allow the communication from the desktop environment 10-X to the file server. Additionally, in the same manner, also for the task server of the task server group 5, the task environment setting section 24 changes the setting of firewall and gives an execution authority so that the user A can use the AP3.

(13) Step S113

Regarding the "AP1" of the available AP, to the generated desktop environment 10-X, the task environment setting section 24 installs individual APs with use of the software distribution system and distributes the AP with use of an application virtualization function. As an example of the software distribution system, the "System Management Server" of the Microsoft Co., Ltd (a registered trademark) and the like can be considered. In addition, as an example of the application virtualization function, the "Application Virtualization" of the Microsoft Co., Ltd (a registered trademark) and the like can be considered. That is, the task environment setting section 24 executes environment setting processing to the generated desktop environment in accordance with the set task environment.

(14) Step S114

The task environment setting section 24 records to the processing result table 25 that the environment settings have been executed (in FIG. 5, the task environment required for the projects A and B is set).

Next, a second exemplary embodiment of the present invention will be explained below.

A configuration of the task environment generation system according to the present exemplary embodiment is the same as that of the first exemplary embodiment. That is, the task environment generation system according to the exemplary embodiment is shown as illustrated in FIG. 2.

Referring to FIG. 11, an operation of the task environment generation system according to the second exemplary embodiment of the present invention will be explained.

(1) Step S201

In the case where the desktop environments of a user B and the user C are generated, the user information management server 3 firstly records the information required for the user organization table 31 and the project table 32 in the same manner as that of the first exemplary embodiment. Here, as a noteworthy point, in FIG. 7, the user B and the user C belong to a same division and a same post; however, in FIG. 8, the unique settings of the members are different because the roles of them are different in the project.

(2) Step S202

Next, referring to the user organization table 31, the desktop environment generation section 22 obtains the attribution information of the user A and the user B. In FIG. 7, the user A and the user B are both in charge of training in a planning division, and their posts are persons in charge.

(3) Step S203

Moreover, referring to the template related to the planning division, to the person in charge of training, and to the person in charge (the template B in FIG. 3) in the desktop environment setting table 21, the desktop environment generation section 22 generates the desktop environment 10-Y and the desktop environment 10-Z to the desktop environment server 1.

(4) Step S204

The desktop environment generation section 22 records the result of the generation of the desktop environments to the processing result table 25. FIG. 5 shows that the user B and the user C use any one of the desktop environment 10-Y and the desktop environment 10-Z.

(5) Step S205

In addition, referring to the task environment setting table 23, since the project period of the project A ends at Sep. 31, 2008, the desktop environment generation section 22 also records the information to the processing result table 25.

(6) Step S206

At the same time, the desktop environment generation section 22 notifies the generation of the desktop environment 10-Y and the desktop environment 10-Z for the user B and the user C to the task environment setting section 24.

(7) Step S207

Referring to the processing result table 25, the task environment setting section 24 executes the required setting to the task server of the task server group 5 and the like. At this stage, since used by any one of the user B and the user C, the generated desktop environment 10-Y and desktop environment 10-Z do not reflect a unique condition (in FIG. 8, "the USB is not available" for the user B and the like). As described above, because there is a commonly-used desktop environment in the thin client system, at the timing when the desktop environment is generated, the unique condition is recorded only in the processing result table 25, and accordingly is not reflected actually.

(8) Step S208

And then, in the case where a user conducts the task from the thin client terminal 6, the thin client terminal 6 asks the session management section 26 a connecting destination. In the present invention, since the session management itself can be executed by already-existing techniques, explanations of the control and table for the session management will be omitted.

(9) Step S209

In the case of a connection request from a predetermined user, referring to the processing result table 25, the session management section 26 instructs the task environment generation agent of the desktop environment to execute the unique setting depending on the user. Here, referring to the processing result table 25, in the case of a connection request from the user B, the session management section 26 instructs the task environment generation agent 13-Y of the desktop environment 10-Y and the task environment generation agent 13-Z of the desktop environment 10-Z to set the USB not to be available, and thereby executing a unique setting, that conventionally depended on the desktop environment.

(10) Step S210

In addition, at the timing when termination of use of the desktop environment 10-Y (the logoff) has been detected, the task environment generation agent 13-Y deletes the individually-set contents to return the state to be original. In the same manner, at the timing when termination of use of the desktop environment 10-Z (the logoff) has been detected, the task environment generation agent 13-Z deletes the individually-set contents to return the state to be original.

(11) Step S211

Moreover, referring to the processing result table 25 at any proper timing, the desktop environment generation section 22, in the same manner, deletes the desktop environment and the task environment related to the project in the case where each of the project periods exceeds the present date and time. As an example, the any proper timing may be periodical and may be human operation.

As described above, the present invention relates to a task environment generation system for, in the thin client system, reducing the constructing and setting of the system and a management operation not only due to personnel change of a user but also due to a change of task and project by automatically generating not only the desktop environment used by the user but also the task environments depending on the project to which the user belongs.

In addition to a desktop environment server, a management server, and a user information management server for storing a user and an attribution (the division, the post, and the like) of the user, a task environment generation system of the present invention includes a network infrastructure apparatus group and a task server group.

In addition, the management server includes a desktop environment setting table, desktop environment generation means, a task environment setting table, and task environment setting means.

The task environment setting table stores a task environment condition in each of the projects and of the task forces (for example, an available application and a file server path). In accordance with the setting of the task environment setting table, the task environment setting means automatically executes the setting required for conduction of the task (for example, the setting of the access authority of the file server and the setting of the firewall) at timing when the desktop environment generation means generates the desktop environment.

In addition, when a user starts the task, the session management means automatically sets not only a simple desktop environment but also a task environment for conducting the task to the task environment generation agent by executing the setting for each of the users, before connection to the desktop environment via the session management means.

In the task environment generation system of the present invention, not only a simple desktop environment is automatically generated to a user but also a task environment depending on the task can be automatically set.

In the task environment generation system of the present invention, on the basis of changes of the user attribution and the belonging project, not only the desktop environment but also the task environment can be automatically generated and deleted.

According to the present invention, since not only a desktop environment but also a task environment are automatically generated from the user attribution in a thin client system characterized in that not only the personal use but also the shared use can be realized, for the system manager, the operation man-hour required for the system construction and the setting can be reduced.

In addition, according to the present invention, in a thin client system, since the task environment is generated in accordance with a preliminarily-set content, the available AP, the access authority, and the like can be controlled on the system manager side.

Moreover, according to the present invention, in a thin client system, since the desktop environment and the task environment are automatically generated from the user attribution, the daily maintenance man-hour due to the personnel change and the change of project can be reduced, and since the unnecessary resource and access authority are deleted at the same time, the security will be improved.

In the case of constructing a thin client system, the present invention can be applied to a system required to provide a flexible task environment in a corporation conducting various tasks and projects.

As described above, some exemplary embodiments of the present invention have been described in detail. However, the present invention is not limited to the above-mentioned exemplary embodiments, and modification within the scope of the present invention is included in the present invention.

The present application is based on Japanese patent application No. 2009-050761 filed on Mar. 4, 2009, the priority based on the application is claimed, and the disclosure of the application is incorporated herein by this reference.

The invention claimed is:

1. A task environment generation system comprising:
 a user organization table storing a correspondence between a user and attribution information relevant to the user;
 a desktop environment setting table storing a correspondence between the attribution information relevant to the user and a template of a desktop environment being realized by a virtual machine operated on a server;
 a desktop environment generation section configured to obtain the attribution information relevant to the user whose information is changed by referring to the user organization table when the information of the user stored in the user organization table is changed, and obtain the template of the desktop environment corresponding to the obtained attribution information by referring to the desktop environment setting table, and generate the desktop environment based on the obtained template;
 a project table storing a correspondence between the user and a project to which the user belongs;
 a task environment setting table storing the project and a definition of a task environment used to perform the project; and
 a task environment setting section configured to obtain information of the project to which the user belongs by referring to the project table when the desktop environment generation section generates the desktop environment, and perform a setting of the task environment by changing a setting of a firewall and giving execution authority to: the virtual machine which realizes the desktop environment; and an apparatus included in any of a network infrastructure apparatus group and a task server group which are provided for performing a task by the virtual machine which realizes the desktop environment based on the definition of the task environment corresponding to the project to which the user belongs,
 wherein the task environment setting section is configured to obtain information of the project which is changed by referring to the project table when the information of the project stored in the project table is changed and to perform setting of a second task environment linked to the project after the information of the project stored in the project table is changed to: the virtual machine which realizes the desktop environment and; an apparatus included in any of the network infrastructure apparatus group and the task server group which are provided for performing the task by the virtual machine which realizes the desktop environment based on the definition of the task environment corresponding to the project after the information of the project stored in the project table is changed by referring to the task environment setting table.

2. The task environment generation system according to claim 1, wherein the task environment setting section is configured to perform setting of the task environment to: the virtual machine which realizes the desktop environment; and an apparatus included in any of the network infrastructure apparatus group and the task server group which are provided for performing the task by the virtual machine which realizes the desktop environment based on the definition of the task environment being changed by referring to the task environment setting table when the definition of the task environment corresponding to the project to which the user belongs is changed.

3. The task environment generation system according to claim 1, further comprising:
 a processing result table recording processing result of the desktop environment generation section and the task environment setting section,
 wherein the desktop environment generation section is configured to refer to the processing result table before the generation of the desktop environment, and delete a generated desktop environment when the desktop environment is generated for the user before, and
 the task environment setting section is configured to refer to the processing result table before the setting of the task environment, and delete a set task environment when the task environment is set for the user before.

4. A task environment generation method comprising:
storing a correspondence between a user and attribution information relevant to the user in a user organization table;
storing a correspondence between the attribution information relevant to the user and a template of a desktop environment being realized by a virtual machine operated on a server in a desktop environment setting table;
obtaining the attribution information relevant to the user whose information is changed by referring to the user organization table when the information of the user stored in the user organization table is changed, and obtaining the template of the desktop environment corresponding to the obtained attribution information by referring to the desktop environment setting table, and generating the desktop environment based on the obtained template;
storing a correspondence between the user and a project to which the user belongs in a project table; and
storing the project and a definition of a task environment used to perform the project in a task environment setting table,
wherein information of the project which is changed is obtained by referring to the project table when the information of the project stored in the project table is changed, setting of a second task environment linked to the project is performed after the information of the project stored in the project table is changed to: the virtual machine which realizes the desktop environment, and an apparatus included in any of a network infrastructure apparatus group and the task server group which are provided for performing the task by the virtual machine which realizes the desktop environment based on the definition of the task environment corresponding to the project after the information of the project stored in the project table is changed by referring to the task environment setting table.

5. The task environment generation method according to claim 4, further comprising:
performing setting of the task environment to: the virtual machine which realizes the desktop environment; and an apparatus included in any of the network infrastructure apparatus group and the task server group which are provided for performing the task by the virtual machine which realizes the desktop environment based on the definition of the task environment being changed by referring to the task environment setting table when the definition of the task environment corresponding to the project to which the user belongs is changed.

6. The task environment generation method according to claim 4, further comprising:
recording processing result of the desktop environment generation and the task environment setting in a processing result table,
referring to the processing result table before the generation of the desktop environment, and deleting a generated desktop environment when the desktop environment is generated for the user before, and
referring to the processing result table before the setting of the task environment, and deleting a set task environment when the task environment is set for the user before.

7. A computer-readable, non-transitory medium storing a task environment generation program, which when executed by a computer, causes the computer to perform a method, wherein the method comprises:
storing a correspondence between a user and attribution information relevant to the user in a user organization table;
storing a correspondence between the attribution information relevant to the user and a template of a desktop environment in a desktop environment setting table realized by a virtual machine operated on a server;
obtaining the attribution information relevant to the user whose information is changed by referring to the user organization table when the information of the user stored in the user organization table is changed, and obtaining the template of the desktop environment corresponding to the obtained attribution information by referring to the desktop environment setting table, and generating the desktop environment based on the obtained template;
storing a correspondence between the user and a project to which the user belongs in a project table; and
storing the project and a definition of a task environment used to perform the project in a task environment setting table,
wherein information of the project which is changed is obtained by referring to the project table when the information of the project stored in the project table is changed, setting of a second task environment linked to the project is performed after the information of the project stored in the project table is changed to: the virtual machine which realizes the desktop environment, and an apparatus included in any of a network infrastructure apparatus group and the task server group which are provided for performing the task by the virtual machine which realizes the desktop environment based on the definition of the task environment corresponding to the project after the information of the project stored in the project table is changed by referring to the task environment setting table.

8. The computer-readable medium according to claim 7, wherein the program further makes the computer execute:
performing setting of the task environment to: the virtual machine which realizes the desktop environment; and an apparatus included in any of the network infrastructure apparatus group and the task server group which are provided for performing the task by the virtual machine which realizes the desktop environment based on the definition of the task environment being changed by referring to the task environment setting table when the definition of the task environment corresponding to the project to which the user belongs is changed.

9. The computer-readable medium according to claim 7, wherein the program further make the computer execute:
recording processing result of the desktop environment generation and the task environment setting in a processing result table,
referring to the processing result table before the generation of the desktop environment, and deleting a generated desktop environment when the desktop environment is generated for the user before, and
referring to the processing result table before the setting of the task environment, and deleting a set task environment when the task environment is set for the user before.

* * * * *